United States Patent [19]

Tanaka et al.

[11] 4,384,272
[45] May 17, 1983

[54] IMAGE READING APPARATUS

[75] Inventors: Atsuyuki Tanaka, Shinshiro; Hiroaki Kojima, Toyokawa; Shozo Kaieda, Toyokawa; Tokuzi Kakiuchi, Toyokawa; Nobuaki Nishioka, Toyokawa; Yukio Tadauchi; Hidekazu Nakagami, both of Toyohashi, all of Japan

[73] Assignee: Minolta Camera Kabushiki Kaisha, Osaka, Japan

[21] Appl. No.: 189,943

[22] Filed: Sep. 22, 1980

[30] Foreign Application Priority Data

Oct. 6, 1979 [JP] Japan .................. 54/129132

[51] Int. Cl.³ .............................. G06K 9/00
[52] U.S. Cl. ........................ 382/50; 382/65
[58] Field of Search .............. 340/146.3 F, 146.3 H, 340/146.3 AG; 250/567, 208; 358/161, 168, 37, 39, 282, 284

[56] References Cited

U.S. PATENT DOCUMENTS 3,058,093 10/1962 Vernon et al. ............ 340/146.3 H
3,201,752 8/1965 Rabinow .................. 340/146.3 H
4,149,143 4/1979 Nagano et al. .......... 340/146.3 AG
4,219,736 8/1980 Thibodeau ................ 340/146.3 AG
4,297,676 10/1981 Moriya et al. ............ 340/146.3 AG

FOREIGN PATENT DOCUMENTS 55-10638 1/1980 Japan ..................... 340/146.3 AG

OTHER PUBLICATIONS

Dattilo et al., "Variable Intensity Illumination Scanner Calibration System", IBM Tech. Disc. Bulletin, vol. 21, No. 9, Feb. 1979, pp. 3546-3547.

Primary Examiner—Leo H. Boudreau
Attorney, Agent, or Firm—Wenderoth, Lind & Ponack

[57] ABSTRACT

An improved image reading apparatus which is so arranged that, by providing marks shaded to a predetermined density or darkness for setting a required reading area on an image reading surface, the start mark and end mark are detected by a solid state image sensor for supplying image signals within the required reading range into memory unit based on results of the on detection so as to reduce the memory capacity of the memory unit.

6 Claims, 9 Drawing Figures

IMAGE READING APPARATUS

BACKGROUND OF THE INVENTION

The present invention generally relates to a reading apparatus for reading images and more particularly, to an image reading apparatus employing a solid state image sensor for reading images such as characters, figures and the like.

Conventionally, the image reading apparatus of the above described type is, for example, used for reading images of an original in an electrophotographic copying apparatus, and is so arranged that an original to be read is placed on a transparent plate such as a glass plate or the like of an original platform and its image reading surface is illuminated by a suitable light source, while the image reading surface is scanned by a line-form solid state image sensor to obtain image information signals related to the original, which are converted into binary image signals so as to be successively stored in a memory means.

Incidentally, in the above case, the original to be read does not always occupy the entire area of the image reading surface of the original platform, while in many cases, not only some margins are present in the original, but the entire surface of the original is not necessarily read at all times.

In the conventional image reading apparatus as described in the foregoing, however, it is so arranged that the image signals for the entire surface of the image reading surface are stored in the memory means, and therefore, it has been necessary for the memory means to store signals for unnecessary portions where the original images are not present, thus requiring an unreasonably large memory capacity, with a consequent increase in the size and manufacturing costs for the image reading apparatus.

Additionally, in the known image reading apparatus of the above described type, such inconveniences often take place that, due to the deterioration with time of the light emitting characteristics of the lamp used for illuminating the original and of the photoelectric conversion characteristics of the solid state image sensor, or due to fluctuations of the functioning characteristics at the starting of the lamp, solid state image sensor, etc., the shading of the illuminated image to be read becomes unstable, thus obstructing thecorrect reading of the image. For preventing malfunctions in the image reading as described above, a means for detecting the amount of light amount of the lamp is separately provided so as to control the light emitted from the lamp, but such an arrangement is also disadvantageous in that the lamp light amount control mechanism is complicated, with a consequently high cost.

SUMMARY OF THE INVENTION

Accordingly, an essential object of the present invention is to provide an improved image reading apparatus which is so arranged that, by providing marks shaded to a predetermined density or darkness for setting a required reading area on an image reading surface, the start mark and end mark are detected by a solid state image sensor for applying image signals within the required reading range into a memory based on results of the detection, to thereby reduce the memory capacity of the memory means.

Another important object of the present invention is to provide an improved image reading apparatus of the above described type in which the solid state image sensor is arranged to also serve as light amount detecting means so as to control the amount of light emitted by the illuminating means based on the darkness of the start mark read by the image sensor for enabling a reduction of the number of component parts.

A further object of the present invention is to provide an improved image reading apparatus of the above described type which is simple in construction and accurate in functioning and which has a high reliability, and can be readily manufactured at a low cost for incorporation, for example, into electrophotographic copying apparatus of various types.

In accomplishing these and other objects, according to one preferred embodiment of the present invention, there is provided an image reading apparatus arranged to project image of an original onto a solid state image sensor in which a large number of photoelectric conversion elements are disposed, and to successively read out from the respective photoelectric conversion elements, electrical signals corresponding to the amount of light received for turning said electrical signals into a binary form so as to be stored, which includes a means for illuminating the surface of the original, a means for causing the solid state image sensor to scan in a sub-scanning direction at every completion of reading in a main scanning direction by said solid stage image sensor, a marking for designating a reading portion which projectable onto said image sensor and provided in a position to be illuminated by said illuminating means, a means for detecting that said marking is being projected onto said image sensor during the reading in said main scanning direction, a means for starting the storing of the output of said image sensor as image data upon the detection of said marking, and a means for controlling the light amount which emits a signal for controlling the light amount of said illuminating means by reading a value corresponding to an analog output produced due to the projection of said marking onto said image sensor when said marking is detected.

By the arrangement according to the present invention as described above, an improved image reading apparatus capable of reducing the memory capacity of the memory means has been advantageously presented, with a reduction of the number of components parts, and consequently a simple construction and a low cost.

BRIEF DESCRIPTION OF THE DRAWING

These and other objects and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
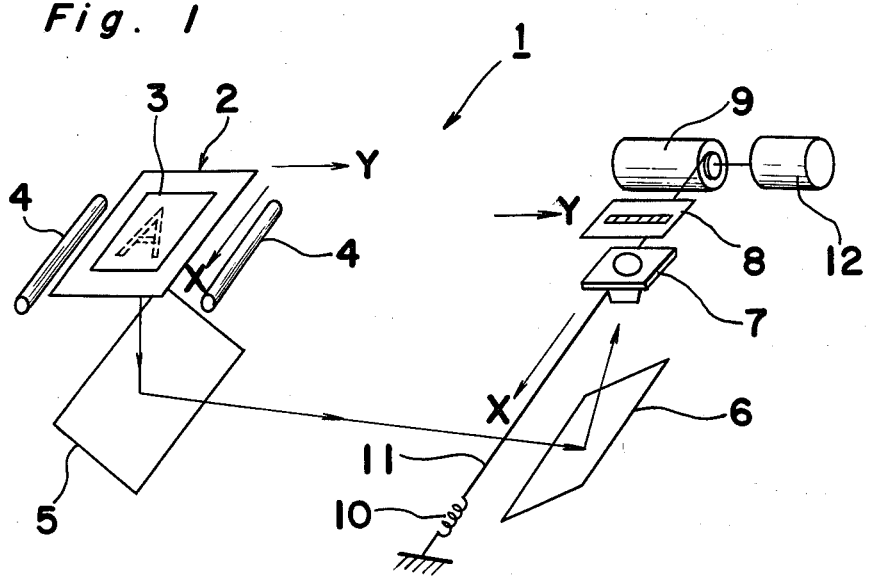
FIG. 1 is a schematic perspective view showing the general construction of an image reading apparatus to which the present invention may be applied.

Referring now to the drawings, there is schematically shown in FIG. 1 a main portion of the specific construction of the image reading mechanism 1 to which the present invention may be applied. The image reading mechanism 1 generally includes an original platform 2 made of a transparent material such as a rectangular glass plate 20 (FIG. 2) or the like for placing an original 3 to be copied thereon; a light source or original illuminating lamps 4 are disposed below and adjacent to the platform 2, and reflecting mirrors 5 and 6 are so disposed as to be spaced a predetermined distance from each other and suitably inclined to direct the light-wise image of the original 3 to a line-form image sensor 8 of the CCD type through a scanning lens 7. Thus, the light-wise image of the original 3 placed on the platform 2 and illuminated by the lamps 4 is reflected by the reflecting mirrors 5 and 6, and projected onto the image sensor 8 via the scanning lens 7.

Although not particularly shown, the image sensor 8 as described above includes a photosensor array in which a large number of, for example, approximately 1000 pieces of photosensor elements of the CCD type and the like are disposed in line in a Y direction, and shift registers so arranged as to successively output the photoelectric output sensed by the photosensor array from the photosensor element at one end of said array in a known manner.

The scanning lens 7 is connected to a rope or wire 11 which has one end wound onto a rotary shaft of a motor 9 coupled to an encoder 12, and has its other end connected to one end of a spring 10 whose other end is suitably connected to a frame (not shown) of the mechanism 1 so a to scan a region $S_0$ (FIG. 2) of a predetermined size on the transparent glass plate 20, i.e. an image reading surface to be read, in a longitudinal direction (indicated by an arrow X), and thus, successively moved at a predetermined pitch in the X direction following the rotation of the motor 9 for projecting the image set on the image reading surface $S_0$ laterally (indicated by an arrow Y) divided into long lines of suitable width, onto the image sensor 8 in the order of the lines.

Figure 2:
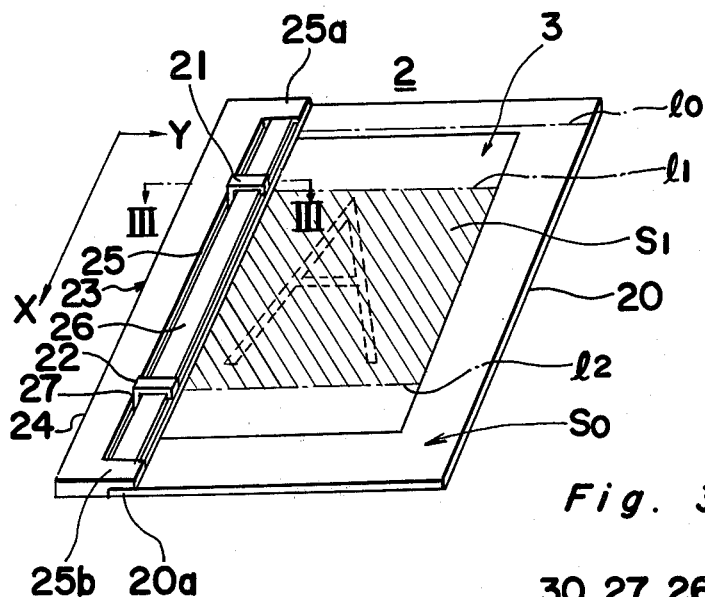
FIG. 2 is a perspective view showing, on an enlarged scale, the structure of a platform for placing an item to be read thereon which is employed in the arrangement of FIG. 1.
Figure 3:
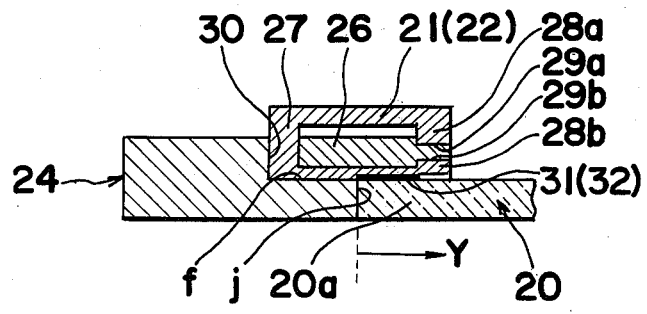
FIG. 3 is a cross sectional view taken along the line III—III in FIG. 2.

Referring also to FIGS. 2 and 3, at the left side edge 20a of the glass plate 20 for the original platform 2 in FIG. 2, there is provided a sliding mechanism 23 having sliding members 21 and 22 for setting the reading range of the original 3. The sliding mechanism 23 further includes a support frame 24 secured to extend in the X direction along the left side edge 20a of the glass plate 20, and a straight guide plate 26 fitted between spaced projections 25a and 25b extending in the Y direction at opposite ends of the support frame 24 and fixed to said projections 25a and 25b so as to provide a suitable clearance 25 with respect to the support frame 24. Each of the sliding members 21 and 22 having a generally flat C shaped cross section is fitted, at its left side portion 27, in the above clearance 25, while opposed projections 28a and 28b (FIG. 3) formed at the right side of each of the sliding members 21 and 22 are fitted onto corresponding stepped portions 29a and 29b formed in the upper and lower surfaces at the right side edge of the guide plate 26, with the under surface 5 and the external surface of the left side portion 27 of each of the sliding members 21 and 22 being fitted in a right angular stepped portion 30 formed in the support frame 24 for allowing sliding movement of the members 21 and 22 in the X direction along the guide plate 26. Additionally, each of the sliding members 21 and 22 is arranged to be located, at its approximately a central portion in the Y direction, on a junction line j between the glass plate 20 and the support frame 24, while at portions on the under surfaces of the respective sliding members 21 and 22 confronting the glass plate 20, there are affixed a start mark 31 and an end mark 32 in black of a suitable depth of shape or darkness and each having a rectangular shaped defined by sides x and y in lengths.

By the above construction, it is so arranged that, by moving the sliding members 21 and 22 in the X direction, boundary lines $l_1$ and $l_2$ for setting the reading region $S_1$ of the original 3 placed on the image reading surface $S_0$ defined on the glass plate surface 20 are determined as shown in FIG. 2.

Figure 4:
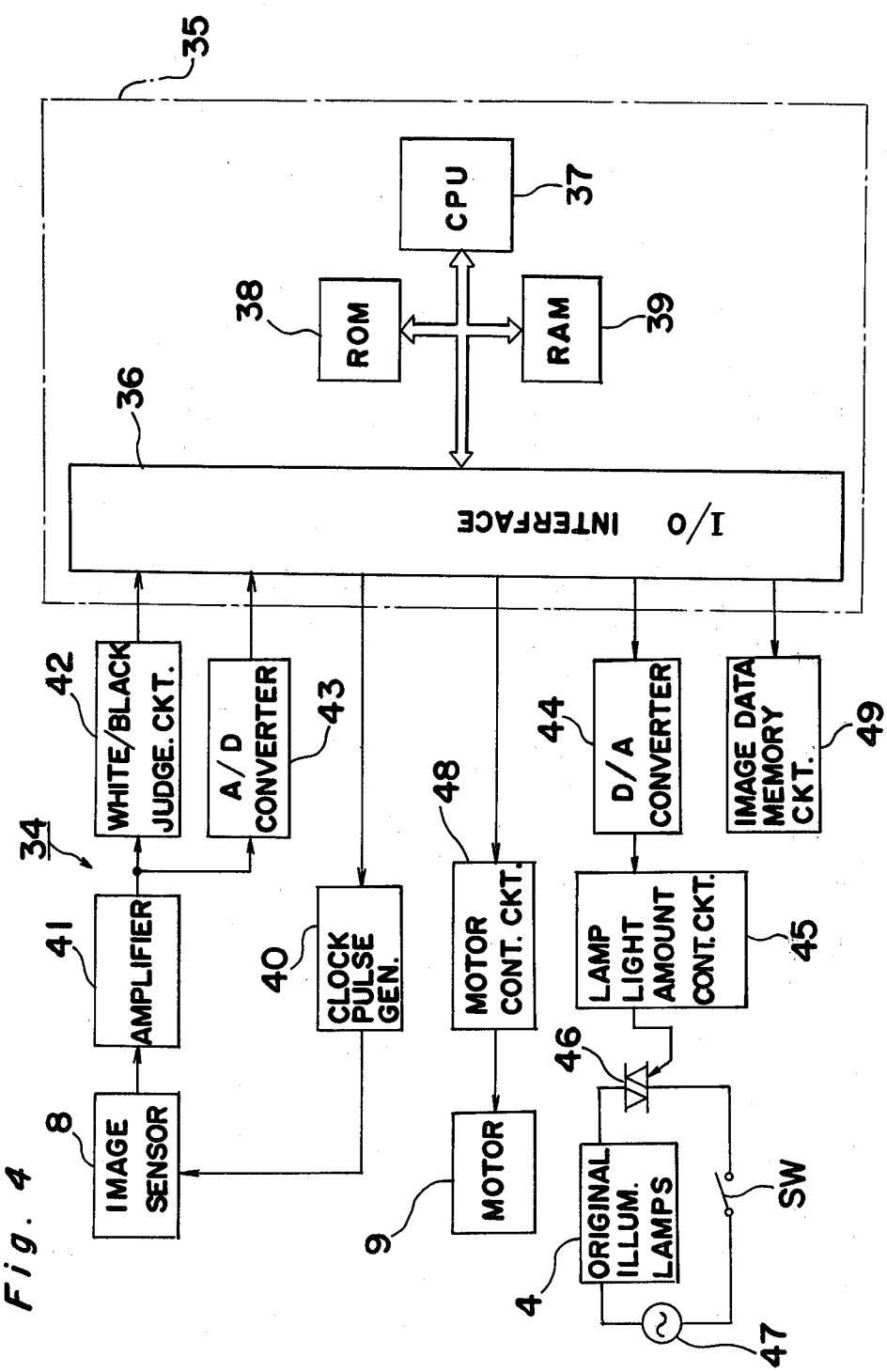
FIG. 4 is an electrical circuit diagram showing the circuit construction of the image reading apparatus according to one preferred embodiment of the present invention.

Referring particularly to FIG. 4, there is shown a circuit construction of the image reading apparatus 34 according to the present invention provided with the reading mechanism 1 as described with reference to FIGS. 1 through 3.

In FIG. 4, the image reading apparatus 34 generally includes a micro-computer 35 having a central processing unit 37 (referred to as CPU hereinbelow) coupled to a read only memory 38 (referred to as ROM hereinbelow) in which the program for reading the original image is stored, a random access memory 39 (referred to as RAM hereinbelow), and also to an input and output control unit 36 (referred to as I/O interface hereinbelow), the input and output terminals of which are further coupled to various appliances and circuits as described hereinbelow.

One output of the I/O interface 36 is coupled to a clock pulse generator 40 which a receives reading instruction signal for one line (one scanning line) of the original image reading surface $S_0$ from the ROM 38 and inputs clock pulse signals of a predetermined frequency into a shift register (not shown) of an image sensor 8; the shift register successively produces, every time one of the pulses of the clock pulse signals described above is received, the photoelectric output of the photosensor element array from the photosensor element at the left end of said array. The image sensor 8 is coupled to an amplifier 41 which sequentially receives the signals produced from the shift register of the image sensor 8, i.e. the signals representing the image information corresponding to each picture element of one scanning line and amplifies the respective input signals to a predetermined level for successive output. The amplifier 41 is further coupled to a white/black judging circuit 42 which judges whether the levels of respective input signals received from the amplifier 41 are higher or lower than a predetermined reference level and outputs binary image signals indicating whether the each picture element of the one scanning line as described above is at the black level "1" or white level "0." The output terminal of the white/black judging circuit 42 is connected to the corresponding input terminal of the I/O interface 36 and the output image signal of the circuit 42 is arranged to be input to the RAM 39, for example, one byte (8 bits) at a time. Meanwhile, $n_0$ bytes ($n_0$ is a predetermined integer) from the first byte up to a predetermined number of bytes are arranged to be equivalent to the length y of the start mark 31 and end mark 32 in the Y direction, and if the $n_0$ bytes ($8 \times n_0$ bits) are all of the black level "0," it is an indication that the image sensor 8 is scanning the scanning line in which the image of the start mark 31 or end mark 32 is present. As described above, it is so arranged that, whether or not the output signal is equivalent to the reading region $S_1$ is judged by detecting whether the $n_0$ bytes of the output signals from the white/black judging circuit 42 are all of a black level "0" or a white level "1." To the output terminal of the amplifier 41, there is also connected an A/D converter 43 for converting the output signal of the amplifier 41 into digital signals, and which is arranged to receive the signal equivalent to the above $n_0 \times 8$ bits, of the output signals from the amplifier 41 so as to output a digital signal indicating the darkness of the image of the start mark 31 during the scanning of the scanning line in which the image of the start mark 31 is present by the image sensor 8. The output terminal of the A/D converter 43 is connected to the corresponding input terminal of the I/O interface 36, so that the digital signal produced by the A/D converter 43 is input to the RAM 39 for being temporarily stored therein, and the signal representing the darkness of the start mark 31 and applied to the RAM 39 from the A/D converter 43 is compared with the reference density stored in the ROM 38 according to a flow chart shown in FIG. 7, while the CPU 37 produces, at one output terminal of the I/O interface 36, the light emitting amount control signal for controlling the amount of light emitted from the lamps 4 so that the density obtained by reading the start mark 31 becomes equal to the reference density.

To another output terminal of the I/O interface 36 for outputting the light emitting amount control signal, there is connected a D/A converter 44 which converts said light emitting amount control signal from a digital form into an analog signal, and which is coupled to a lamp light amount control circuit 45. The lamp light amount control circuit 45 is arranged to receive the analog signal for the light emitting amount control from the D/A converter 44 for producing a gate control signal to be applied to the gate of a triac 46 so as to control the light emitting amount of the lamps 4 which are coupled to a commercial power source 47 through a switch SW. Still another output terminal of the I/O interface 36 is connected to a control circuit 48 for the motor 9; the control circuit 48 applies, upon receipt of the motor driving instruction signal from the CPU 37, a driving signal to the motor 9 so as to cause the lens 7 to advance by a predetermined amount in the X direction.

To a further output terminal of the I/O interface 36, there is connected the input terminal of an image data memory unit 49 which receives a data signal to be transferred thereto from the RAM 39 through the I/O interface 36 when the image signals applied to the RAM 39 through the white/black judging circuit 42 by the CPU 37 are of a white level "1" for all of the $n_0$ bytes thereof, and also equivalent to the reading region $S_1$, while the output of the above image data memory unit 49 is arranged to be transferred, for example, to a photosensitive drum of an electrophotographic copying apparatus (not shown) so as to form an electrostatic latent image for the reading region of the original on the photosensitive drum.

Subsequently, the operation of the image reading apparatus 34 of the present invention having the construction as described above will be described hereinbelow.

Figure 5:
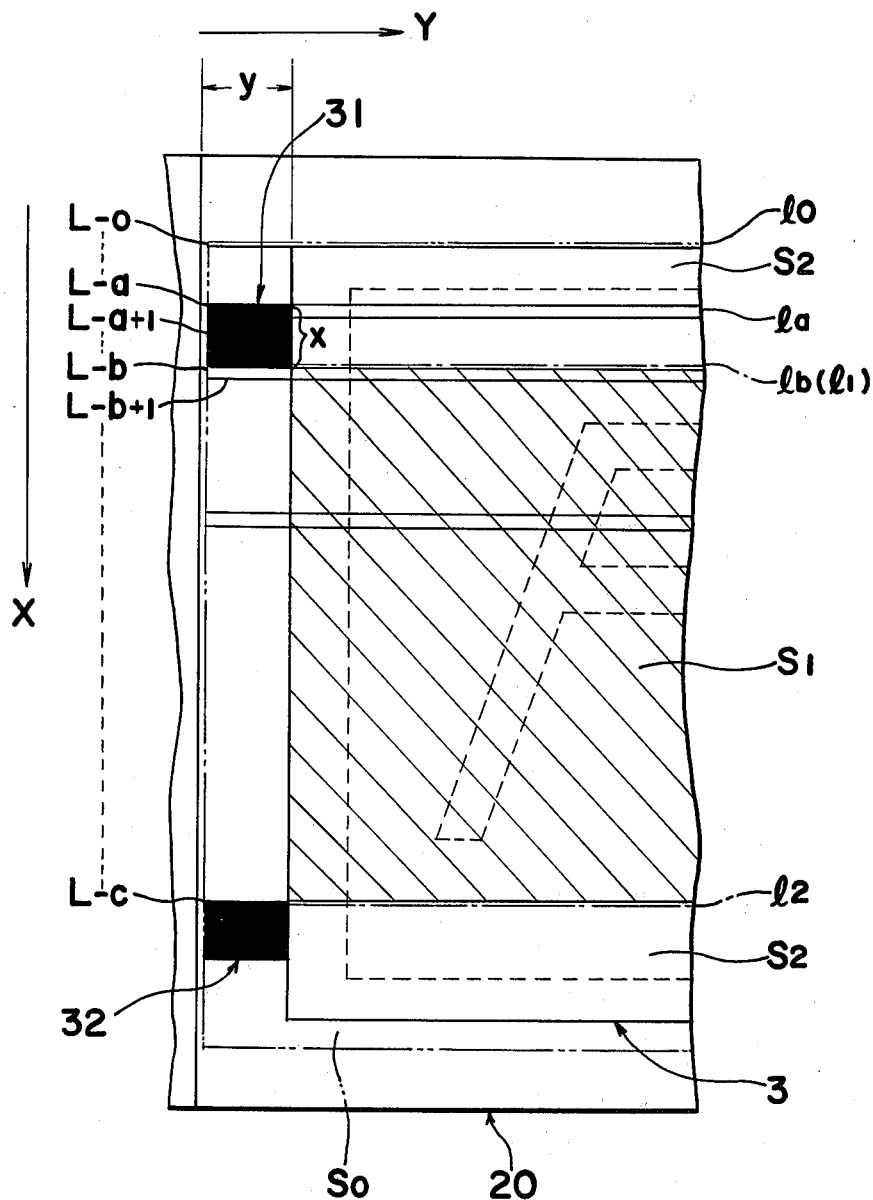
FIG. 5 is a fragmentary top plan view of the reading item placing platform explanatory of one example of the image reading functions of the arrangement of FIG. 4.

On the assumption that the slide members 21 and 22 are to be suitably moved according to the reading area $S_1$ for the original 3 on the glass plate 20 of the original platform 2 as shown in FIG. 2, and the start mark 31 and end mark 32 for the respective sliding members 31 and 32 are positioned as shown in FIG. 5, with the lens 7 being set on a starting line $l_0$ for the reading function, upon the turning ON of a push buttom switch (not shown) for the reading scanning starting instruction of the image reading apparatus 34, the lamps 4 are illuminated by energization from the power source 47 through the triac 46, and the reading scanning starting instruction signal is supplied from the CPU 37 to the clock pulse generator 40 which in turn applies clock pulses to the image sensor 8, and thus, the image information of a scanning line L-O at the uppermost end of the scanning area $S_1$ read by each of the photosensor element of the image sensor 8 is successively output through the shift register from the photosensor element at the left-most end.

Figure 6:
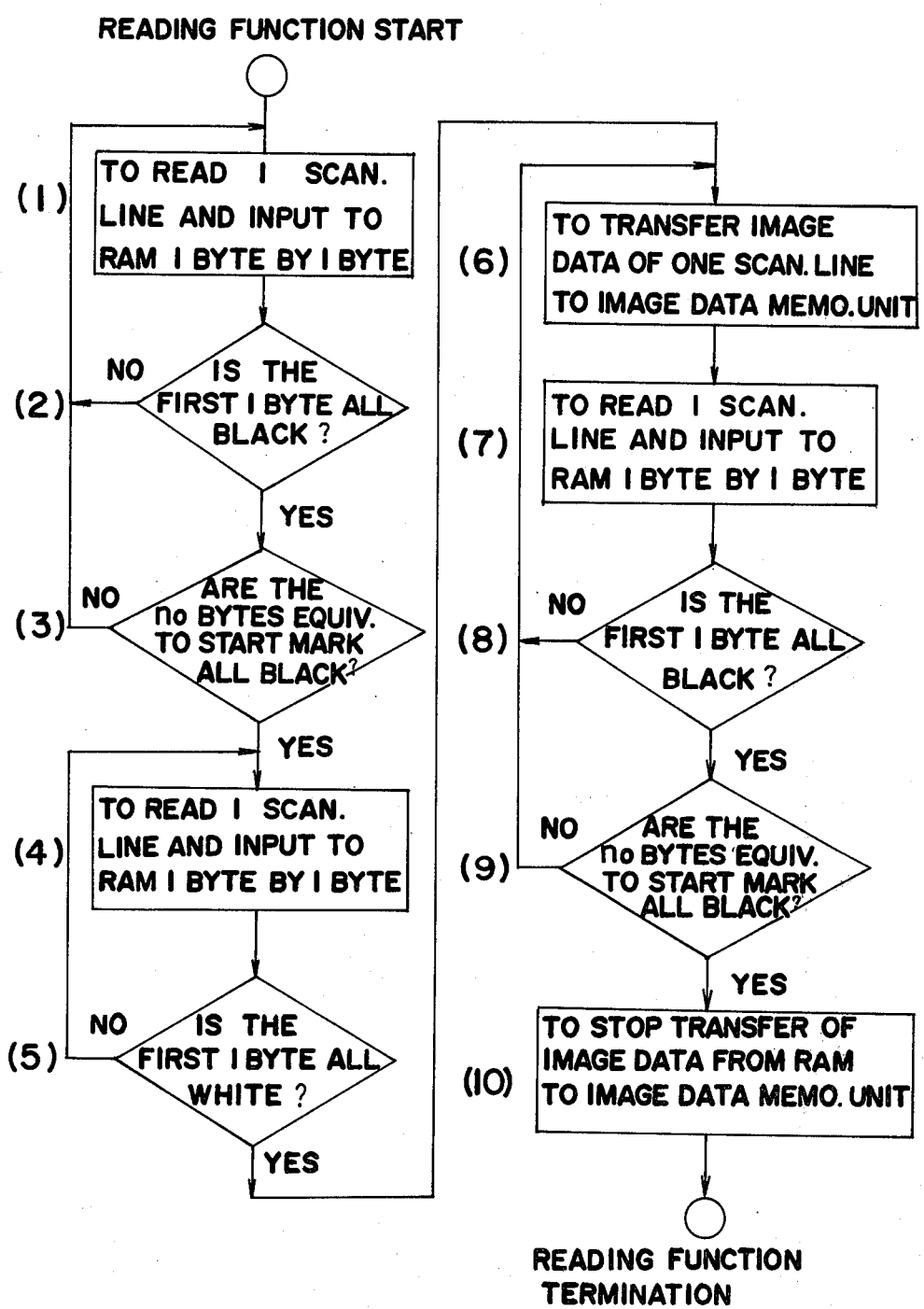
FIG. 6 is a flow chart explanatory of the reading function of the arrangement of FIG. 4.

In the above state, when the image sensor 8 scans the scanning line L-O at the uppermost end of the scanning region from its left end, since the image is not present on the scanning line, a high level signal representing the white level is supplied from the image sensor 8 to the white/black judging circuit 42 through the amplifier 41, and at step (1) of FIG. 6, the signal "1" representing the white level is supplied from the white/black judging circuit 42 to the RAM 39 to be stored therein.

Subsequently, in step (2) of FIG. 6, the image information of the line L-O stored in the RAM 39 as described above is read out for judging whether or not the image information of the first to eighth photosensors (this portion is referred to as the first byte hereinbelow) from the left end of the image sensor 8 is black. As described in the foregoing, since no image is present on the scanning line L-0, the judgement is NO at step (2) so as to revert to step (1) again.

Upon completion of scanning of the scanning line L-0 by the image sensor 8, the motor driving circuit 48 produces a signal by the instruction from the CPU 37 to drive the motor 9, and the lens 7 is advanced in the X direction by the amount equivalent to one scanning line, while the image sensor 8 reads the image of the scanning line L-1 to successively output from its left end, the image information at this portion for repeating the above fucntion up to the position where the start mark 31 is present.

When the reading scanning line of the image sensor 8 reaches the line L-a at the upper end of the start mark 31, with the image sensor 8 reading said start mark 31, the image sensor 8 produces an output signal of a low level corresponding to the black level by the amount equivalent to the length y from the left end. By the output signal corresponding to the start mark 31 as described above, the white/black circuit 42 supplies the image information "0" representing the black level to the RAM 39.

Thereafter, in step (2), it is judged whether the first byte of the image information of the line L-a is white or black, and since said first byte is black in the case, the judgement becomes YES for advancing into step (3), and thus, the image information in the memory region of the RAM 39 equivalent to the Y direction of the start mark 31 is read out for judgement as to whether or not the image information of $n_0$ bytes are all black. In the above case, since $n_0$ bytes are all black, the judgement is YES for advancing into step (4). Upon reading one scanning line, step (5) is entered so as to judge whether the first byte is white or black. Since the line L-a is black, the judgement becomes NO, with the motor 9 driven and the lens 7 advanced, and the image sensor 8 scans the scanning line L-a+1. Due to the fact that the line L-a+1 is also black at the first byte, the functionings as described above are repeated.

Upon the termination of the scanning in the X direction of the start mark 31, the image sensor 8 scans the scanning line L-b+1 immediately below the start mark 31, and the image information of said scanning line is fed to the RAM 39 for being stored thereat.

Subsequently, in step (5), based on the information stored in the RAM 39 as described earlier, it is judged whether or not the first byte of the above scanning line L-b+1 is white. If the first byte of the scanning line L-b+1 is white, it is judged that the image reading area S1 has been entered, and the step is advanced to step (6), so that the image information of the scaning line L-b+1 is read out from the RAM 39 to the image data memory unit 49. Then, the scanning of the image sensor 8 advances in the X direction, and in the respective scanning lines thereafter, the image information read by the image sensor 8 is applied to the RAM 39 and also read out to the image data memory unit 49 for processing of the image information of the original in the similar manner as in the conventional image reading arrangements of this kind.

Meanwhile, during the functioning as described above, the image information from the image sensor 8 at each of the scanning lines is applied, one byte at a time, into the RAM 39 in step (7), and at step (8), the image information equivalent to the first byte is read out from the RAM 39 for judgement as to whether or not said image equivalent to the first one byte is black. If it is black, the step is reverted to step (6) for repeating the similar functionings as described so far.

When the reading by the image sensor 8 reaches the upper end of the end mark 31 and reads the scanning line L-c, the output of the image sensor 8 becomes a low level for the length y from the left end, i.e. with all of the $n_0$ bytes again corresponding to the black level, and thus, at step (8), the image equivalent to the first byte is judged to be black, while at step (9) also, all of the $n_0$ bytes are judged to be black. Then, the step is advanced to step (10) where the completion of the scanning of the reading area S1 is detected so as to suspend the transfer of the image signal to the image data memory unit 49.

It is to be noted here that, in the arrangement as described above, by altering the positions of the start mark 31 and end mark 32 through movements of the respective sliding members 21 and 22 along the guide plate 26 in the X direction, the reading starting position and reading terminating position for the original 3 may be changed as desired.

It should also be noted that, in steps (3) and (9), the judgement as to whether or not all of the bytes in the Y direction of the start mark 31 and end mark 32 are black is intended to prevent dust, dirt, flaws, etc. present on the original platform from being read as a start mark or end mark.

In the image reading apparatus 34 having the construction as described in the foregoing, it is possible to transfer only the image signal of the required reading area S1 of the original 3 into the image data memory unit 49 merely by properly setting the sliding members 21 and 22 and consequently the start mark 31 and end mark 32 according to the boundary lines 11 and 12 of the required reading area S1 of the original 3, with respect to said original 3 placed on the image reading surface $S_0$ set on the glass plate 20 of the original platform 2.

Accordingly, since image signals of the areas S2 and S3 are unnecesarry for the reading of the original 3 and are not applied to the image data memory unit 49, the required memory capacity of the image data memory unit 49 and RAM 39 may be advantageously reduced.

Subsequently, the light emitting amount control functions for the lamps 4 will be described hereinbelow with reference to a flow chart of FIG. 7.

The light emitting amount adjustments for the lamps 4 are effected by the lamp light amount control system including the A/D converter 43, micro-computer 35, D/A converter 44, light amount control circuit 45 and triac 46.

The above D/A converter 44 is a pre-stage which functions during the image reading function with respect to the scanning lines L-a to L-b, and more specifically, which inputs the image signal with respect to the reading area S1 of the original 3 into the image data memory unit 49, and is arranged to function by receiving the light emitting amount control digital signal for the lamp 4 from the micro-computer 35.

As the image sensor 8 reads the upper limit line la of the start mark 31, the signal equivalent to the amount of light reflected by the line of said start mark 31 is amplified by the amplifier 41, and the signal thus amplified is applied to the A/D converter 43, from which the digital signal representing the density of the start mark 31 on the scanning line L-a is output so as to be temporarily stored in the RAM 39 through the I/O interface 36.

Figure 7:
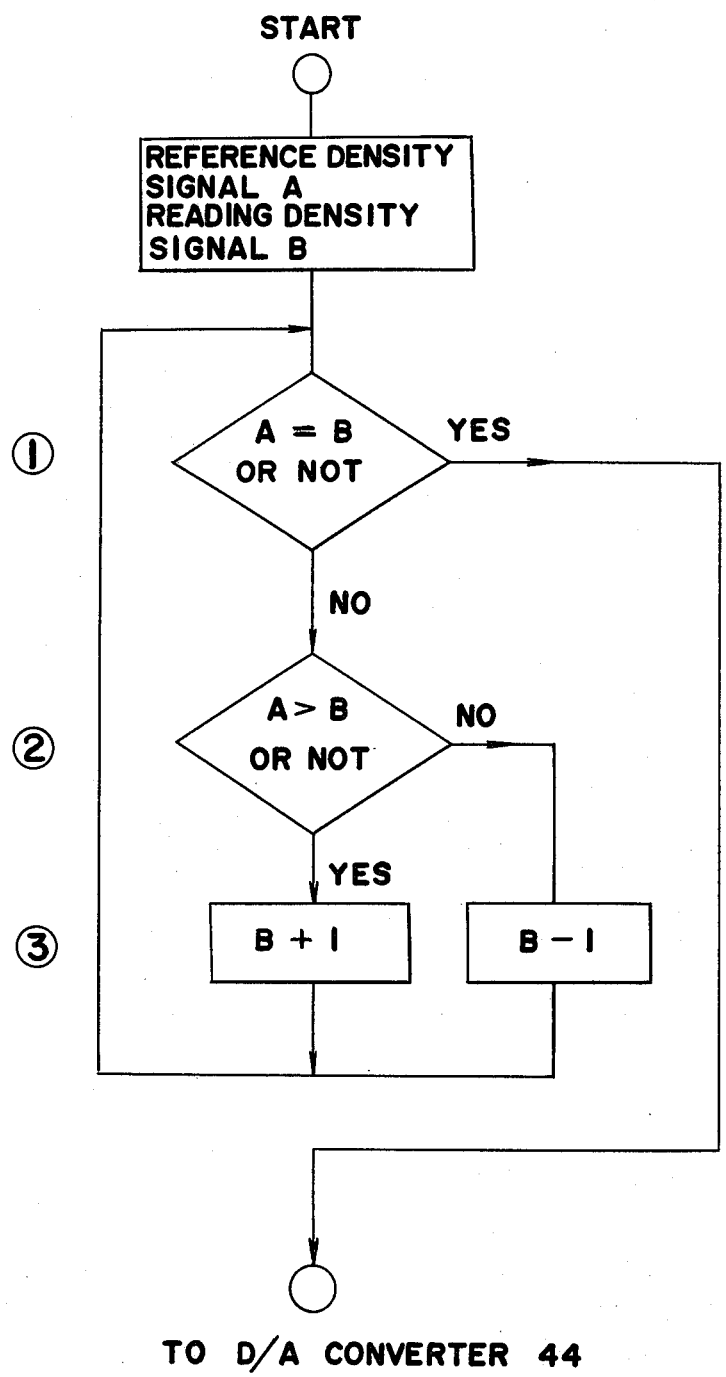
FIG. 7 is another flow chart explanatory of the illuminating means light emitting amount control function of the arrangement of FIG. 4.

More specifically, as shown in FIG. 7, in step ①, a reference densisty signal A set for program from the ROM 38 and a reading density B representing the image density of the start mark 31 from the RAM 39 are read out into a register (not shown).

In step ②, by an arithmetic circuit or ALU (not shown) of the micro-computer 35, judgement is made as to whether or not the above reference density signal A and the signal B representing the image density of the start mark 31 are equal to each other. If the relationship is A−B, the judgement is YES, and the predetermined digital signal corresponding to the signal B which represents the density of the image of the start mark 31 as described above is applied to the D/A converter 44 for being converted into an analog signal, which is then applied to the light amount control circuti 45. From said light amount control circuit 45, a predetermined gate control signal is applied to the gate of the triac 46 so that the existing light amount of the lamps 4 is maintained, as a result of which the amount of power fed from the power source 47 is kept up, and thus, in other words, the image reading surface $S_0$ is illuminated by the lamps 4 in such a manner that the density of the image to be read which is disposed on said reading surface $S_0$ becomes a predetermined density (reference density A).

Meanwhile, if the relationship is A≠B, the judgement is NO for effecting the treatment at the subsequent step 3 .

In step 3 , the difference value between the above described reference density signal A and the signal B representing the image density of the start mark 31 is determined. If the value of the signal A is larger than that of the signal B, the judgement is YES, and 1 is added to the signal B, with simultaneous returning to step 2 again for effecting judgement as to whether A=B. The above functions are repeated to calculate the difference value between the signal B indicating the density by the existing lamps 4 and the reference density signal A, and the digital signal equivalent to the above difference value is applied to the D/A converter 44 through the I/O interface 36, and converted in said D/A converter 44 into an analog signal, which is further applied to the light amount control circuit 45. From said light amount control circuit 45, the gate control signal is applied to the gate of the triac 46 so that, by increasing the existing amount of light emitted from the lamps 4, the density of the start mark 31 illuminated by the lamps 4 becomes equal to the reference density A mentioned earlier.

On the other hand, if the value of the above described signal A is smaller than that of the signal B, the judgment is NO, with a subtraction of 1 from the signal B occurring before returning again to step 2 to effect the judgement as to whether or not A=B. Such functions as described above being repeated, a digital signal equivalent to the difference value between the signals A and B is applied to the D/A converter 44 so as to be converted thereat into an analog signal, which is further applied to the light amount control circuit 45. From said light amount control circuit 45, the gate control signal is applied to the gate of the triac 46 so that, by reducing the existing amount of light emitted by the lamps 4, the density of the start mark 31 illuminated by the lamps 4 becomes equal to the reference density A.

By adjusting the amount of light emitted by the lamps 4 in the manner as described in the foregoing, even when the amount of light emitted by the lamps 4 becomes excessive or insufficient due to a deterioration of the lamps with time, or due to the adhesion of dust and dirt to the reflecting mirrors 5 and 6 and lens 7 in the illuminating path of the lamps 4 with respect to the image reading surface $S_0$, or due to the deterioration of the image sensor 8 with respect to its photoelectric conversion characteristics, etc., the amount of light emitted by the lamps 4 may be adjusted by the time when the reading function for the original image to be read (i.e. the image within the reading area S1) is started so that the density of the image to be read becomes equal to the reference density at all times. Especially, in the above arrangement according to the present invention, the image sensor 8 is also effectively utilized for the adjustment of the amount of light emitted by the lamps, without the necessity of installing a separate photoelectric converting means for the lamp light amount detection, whereby the number of parts required for the image reading apparatus 34 is reduced by that extent, with a consequent reduction in the manufacturing cost. Although the rising characteristics of the image sensor 8, amplifier 41, white/black judging circuit 42, etc. immediately after starting of the image reading apparatus 34 are normally unstable to a certain extent, their functionings can be sufficiently stabilized during the processing period to be effected through utilization of the image of the start mark 31 in the manner as described earlier with reference to steps (2) and (3) in FIG. 6 and steps 1 to 3 in FIG. 7. Furthermore, if the end mark 32 is also arranged to have the same density or darkness as that of the start mark 31, it is possible to re-adjust the amount of light emitted by the lamps 4 by the end mark 32 and further, to have the amount of light emitted by the lamps 4 preliminarily adjusted.

Figure 8:
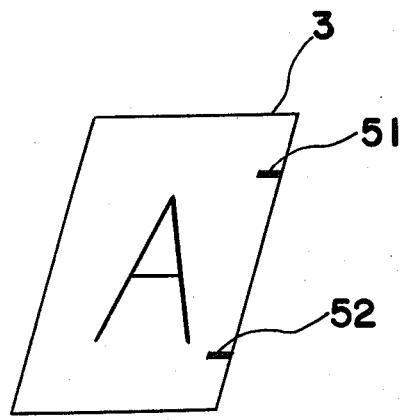
FIGS. 8 and 9 are views similar to FIG. 2, but particularly show modifications thereof.
Figure 9:
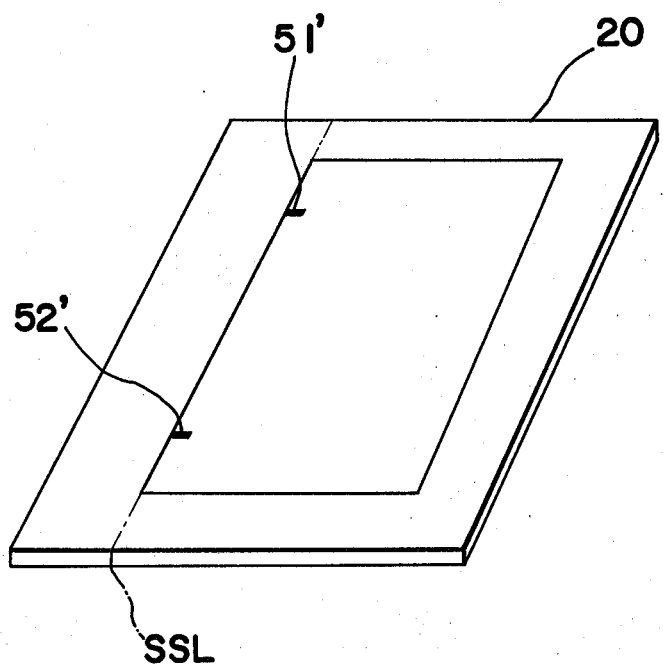

It should be noted here that the start mark 31 and end mark 32 described so far may be replaced, as shown in FIG. 8, by a start mark 51 and an end mark 52 of predetermined sizes shaded to predetermined density and directly affixed to the edge portion of the original 3, or as shown in FIG. 9, by a start mark 51' and end mark 52' directly affixed on the transparent glass plate 20 of the original platform 2 at predetermined positions along a scanning standard line SSL.

It should also be noted here that although the image sensor 8 described as employed in the foregoing embodiments is in the form of a line sensor in which the photoelectric conversion elements are arranged in one row in the main scanning direction (Y direction), such a line sensor may be replaced by one in which photoelectric conversion elements are arranged in a planar configuration. In this case, the mechanical scanning arrangement in the sub-scanning direction (X direction) such as the movement of the lens unit 7 by the motor 9 as in the foregoing embodiment is not required, and it may be so arranged as to emit a signal for effecting the sub-scanning every time the reading in the main scanning direction is terminated through electrical processing by the micro-computer 35. The flow-chart of FIG. 7 may be also applied to the above case, requiring almost no alterations.

Additionally, although it is preferable that the start mark and end mark intended to correct the amount of light of the illuminating means or lamps 4 by the light reflected thereby are arranged to have a color which is similar to that of the image of the original or having similar light reflectance to that of the image of the original, these marks have only to satisfy the requirements that they are provided in positions projectable onto the image sensor and properly illuminated by the illuminating lamps. Furthermore, in the case where, for example, the guide plate 26 shown in FIGS. 2 and 3 is shaded or colored, the start mark and end mark may be white for discrimination from the shade of the guide plate 26 by the level judging circuit 42. In this case, judgment of white and black may be reversed in the flow chart of FIG. 6. Moreover, in the case where the start mark and end mark are directly affixed to the original, these marks may be white, if the background of the original is of a shade from the black group. Meanwhile, it is clear that the processing system of the signal for determining the reading area of the image by the marks as described in the foregoing is readily applicable to the main scanning direction as well.

As is clear from the foregoing description, according to the image reading apparatus of the present invention, it is so arranged that, by disposing the marks shaded to the predetermined density on the image reading surface of the predetermined region according to the required reading area of the item to be read, the presence or absence of the image information equivalent to the marks is detected from the image information of the above image reading surface read by the solid state image sensor, and the reading region of the solid state image sensor is determined based on the result of the above detection, while the amount of light emitted from the illuminating means or lamps for illuminating said image reading surface is controlled so that the image of the predetermined density to be read is formed on the image reading surface at all times on the basis of the image information signal of the image of the start mark obtained by the above image sensor. Accordingly, by merely effecting positioning of the marks with respect to the image reading surface, only the required image information of the item to be read is transferred to the image data memory means. In other words, the memory means as described above does not require a large storage capacity for storing all of the image information on the image reading surface as in the conventional arrangements, thus contributing to a large extent to the reduction of size and manufacturing cost of the image reading apparatus. In addition, since the image sensor is simultaneously used for the photoelectric conversion means for adjusting the amount of light emitted by the illuminating means, the separate installation of the photoelectric conversion means as in the conventional arrangements is not necessary, and thus, the image reading apparatus is simplified in construction, with a further reduction of the manufacturing cost to that extent.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image reading apparatus which is arranged to project an image of an original onto a solid state image sensor in which a large number of photoelectric conversion elements are disposed, and to successively read out from respective photoelectric conversion elements, electrical signals corresponding to an amount of light which is received and for providing output signals into binary form corresponding to said electrical signals so as to be stored, said image reading apparatus comprising;

a means for illuminating the surface of said original which is supported on a plate by emitting light;

a marking member movably provided for displacement in a sub-scanning direction along the surface of said plate, said marking member being disposed in a position to be illuminated by said illuminating means and projectable onto said solid state image sensor;

a means for judging said marking member as being projected onto said solid state image sensor, when a particular combination of signals is read out during a reading out of a signal corresponding to a light pattern projected onto said solid state image sensor;

a means for starting the storing of said output of said image sensor as image data upon judgement of said marking; and a means for controlling an amount of light, said means emitting a signal for controlling said amount of light emitted by said illuminating means by reading a value corresponding to a analog output produced due to the projection of said marking member onto said image sensor when said marking member is judged.

2. An image reading apparatus as claimed in claim 1, further comprising a level judging means for judging a level of said image sensor output and for providing an output in binary form corresponding thereto, said marking judging means being arranged to judge said marking by detecting that said binary output from said level judging means is of predetermined level corresponding to the shade of said marking for all of a plurality of continuous predetermined bit numbers.

3. An image reading apparatus as claimed in claim 1, further comprising a digital converting means for converting an analog output of said image sensor into a digital form, said analog output produced by said marking projected onto said image sensor being applied to said light amount control means through said digital converting means.

4. An image reading apparatus as claimed in claim 1, further comprising a means for stopping the storing of the image data, said image data storing stopping means having an end marking and a means for ceasing the storing of said image data when said end marking is judged by said mark judging means during the storing of image data.

5. An image reading apparatus as claimed in claim 1, wherein said marking is shaded to a shade approximately equal to that of the image of said original.

6. An image reading apparatus as claimed in claim 1, 2, 3, 4, or 5, wherein at least said mark judging means, said image data storing starting means, and said means for reading the value corresponding to the analog output of said image sensor are set by means of a program stored in a micro-computer.

* * * * *